(12) United States Patent
Caretta et al.

(10) Patent No.: US 7,964,128 B2
(45) Date of Patent: Jun. 21, 2011

(54) PROCESS AND APPARATUS FOR CONTINUOUSLY PRODUCING AN ELASTOMERIC COMPOSITION

(75) Inventors: Renato Caretta, Gallarate (IT); Maurizio Galimberti, Milan (IT); Cristiano Puppi, Guanzate (IT); Cesare Amurri, Sesto San Giovanni (IT); Stefano Testi, Monza (IT); Francesco Romani, Sarzana (IT)

(73) Assignee: Pirelli Pneumatici S.p.A., Milan (IT)

( * ) Notice: Subject to any disclaimer, the term of this patent is extended or adjusted under 35 U.S.C. 154(b) by 861 days.

(21) Appl. No.: 10/497,999

(22) PCT Filed: Dec. 4, 2002

(86) PCT No.: PCT/EP02/13710
§ 371 (c)(1),
(2), (4) Date: Oct. 26, 2004

(87) PCT Pub. No.: WO03/051596
PCT Pub. Date: Jun. 26, 2003

(65) Prior Publication Data
US 2005/0040555 A1 Feb. 24, 2005

Related U.S. Application Data

(60) Provisional application No. 60/342,368, filed on Dec. 27, 2001.

(30) Foreign Application Priority Data

Dec. 19, 2001 (EP) ..................................... 01130165

(51) Int. Cl.
*B29C 47/36* (2006.01)
(52) U.S. Cl. .................... 264/211.21; 264/142; 264/148

(58) Field of Classification Search .................. None
See application file for complete search history.

(56) References Cited

U.S. PATENT DOCUMENTS 3,352,952 A 11/1967 Marr
(Continued)

FOREIGN PATENT DOCUMENTS

DE 32 12 643 A1 10/1983
(Continued)

OTHER PUBLICATIONS

Harry Ellwood, "A Tale of Continuous Development," European Rubber Journal, Mar. 1987 pp. 26-28.
(Continued)

*Primary Examiner* — Monica A Huson
(74) *Attorney, Agent, or Firm* — Finnegan, Henderson, Farabow, Garrett & Dunner, L.L.P.

(57) ABSTRACT

A process for continuously producing an elastomeric composition includes metering at least one elastomer, at least one filler, and at least one minor ingredient; feeding the at least one elastomer, the at least one filler, and the at least one minor ingredient into at least one extruder; mixing and dispersing the at least one filler and the at least one minor ingredient into the at least one elastomer using the at least one extruder; obtaining a subdivided product from a resulting elastomeric composition discharged from the at least one extruder; accumulating an amount of the subdivided product; and stirring the accumulated amount of the subdivided product. An apparatus for continuously producing an elastomeric composition includes at least one extruder, at least one first metering device, at least one second metering device, at least one device for obtaining a subdivided product, and at least one accumulating and stirring device.

12 Claims, 5 Drawing Sheets

U.S. PATENT DOCUMENTS

| | | | |
|---|---|---|---|
| 3,816,358 A | 6/1974 | Nordsiek et al. | |
| 4,092,285 A | 5/1978 | Leo et al. | |
| 4,153,772 A | 5/1979 | Schwesig et al. | |
| 4,197,381 A | 4/1980 | Alia | |
| 4,422,810 A | 12/1983 | Boring | |
| 4,550,142 A | 10/1985 | Akita et al. | |
| 4,670,181 A | 6/1987 | Mollinger et al. | |
| 4,675,349 A | 6/1987 | Palombo et al. | |
| 4,680,330 A | 7/1987 | Berrier et al. | |
| 4,708,617 A * | 11/1987 | Herrington | 425/135 |
| 4,742,124 A | 5/1988 | Tsutsumi et al. | |
| 4,768,937 A | 9/1988 | Singh | |
| 4,804,510 A | 2/1989 | Luecke et al. | |
| 4,872,822 A | 10/1989 | Pizzorno | |
| 4,886,850 A | 12/1989 | Ogawa et al. | |
| 4,895,692 A | 1/1990 | Laurent et al. | |
| 4,897,236 A | 1/1990 | Räbiger et al. | |
| 4,962,262 A | 10/1990 | Winter et al. | |
| 4,973,627 A | 11/1990 | Mitchel | |
| 5,008,204 A | 4/1991 | Stehling | |
| 5,036,132 A | 7/1991 | Coran | |
| 5,096,867 A | 3/1992 | Canich | |
| 5,118,773 A | 6/1992 | Takao et al. | |
| 5,158,725 A | 10/1992 | Handa et al. | |
| 5,227,425 A | 7/1993 | Rauline | |
| 5,229,478 A | 7/1993 | Floyd et al. | |
| 5,246,783 A | 9/1993 | Spenadel et al. | |
| 5,262,111 A | 11/1993 | Capelle et al. | |
| 5,272,236 A | 12/1993 | Lai et al. | |
| 5,302,635 A | 4/1994 | Brinkmann et al. | |
| 5,341,863 A | 8/1994 | Sandstrom et al. | |
| 5,353,997 A | 10/1994 | Kasseck et al. | |
| 5,358,693 A | 10/1994 | Brinkmann et al. | |
| 5,374,387 A | 12/1994 | Barnes et al. | |
| 5,414,040 A | 5/1995 | McKay et al. | |
| 5,573,610 A | 11/1996 | Koch et al. | |
| 5,593,747 A | 1/1997 | Georgelos | |
| 5,626,420 A | 5/1997 | Deal et al. | |
| 5,703,187 A | 12/1997 | Timmers | |
| 5,711,904 A | 1/1998 | Eswaran et al. | |
| 5,744,566 A | 4/1998 | Tsutsui et al. | |
| 5,773,053 A | 6/1998 | Song et al. | |
| 5,908,645 A | 6/1999 | Townsend et al. | |
| 6,028,143 A | 2/2000 | Mukai | |
| 6,037,418 A | 3/2000 | Mukai et al. | |
| 6,046,287 A | 4/2000 | Galimberti et al. | |
| 6,068,694 A | 5/2000 | Bernard et al. | |
| 6,075,116 A | 6/2000 | Moriwaki et al. | |
| 6,135,180 A | 10/2000 | Nohara | |
| 6,207,746 B1 | 3/2001 | Uchida et al. | |
| 6,277,916 B1 | 8/2001 | Terbrueggen et al. | |
| 6,313,212 B1 * | 11/2001 | Caretta et al. | 524/493 |
| 6,315,019 B1 | 11/2001 | Garlaschelli et al. | |
| 6,325,956 B2 | 12/2001 | Chaudhary et al. | |
| 6,380,341 B1 | 4/2002 | Waymouth et al. | |
| 6,401,779 B1 | 6/2002 | Riva et al. | |
| 6,464,607 B1 | 10/2002 | Rosenboom et al. | |
| 6,550,508 B1 | 4/2003 | Yamaguchi et al. | |
| 6,566,432 B2 | 5/2003 | Kawamura et al. | |
| 7,014,922 B2 | 3/2006 | Riva et al. | |

FOREIGN PATENT DOCUMENTS

| | | |
|---|---|---|
| DE | 196 19 509 A1 | 11/1997 |
| EP | 0 035 342 A2 | 9/1981 |
| EP | 0 117 834 A1 | 9/1984 |
| EP | 0 129 368 A1 | 12/1984 |
| EP | 0 199 064 B1 | 10/1986 |
| EP | 0 206 794 A1 | 12/1986 |
| EP | 0 242 840 A1 | 10/1987 |
| EP | 0 277 003 A1 | 8/1988 |
| EP | 0 277 004 A1 | 8/1988 |
| EP | 0 321 852 A1 | 6/1989 |
| EP | 0 380 145 | 8/1990 |
| EP | 0 416 815 A2 | 3/1991 |
| EP | 0 418 044 A2 | 3/1991 |
| EP | 0 420 436 A1 | 4/1991 |
| EP | 0 451 604 B1 | 10/1991 |
| EP | 0 501 227 A1 | 9/1992 |
| EP | 0 514 828 A1 | 11/1992 |
| EP | 0 632 065 A1 | 1/1995 |
| EP | 0 728 797 A1 | 8/1996 |
| EP | 0 754 571 B1 | 1/1997 |
| EP | 0 827 978 A1 | 3/1998 |
| EP | 0 855 413 A1 | 7/1998 |
| EP | 0 889 091 A1 | 1/1999 |
| EP | 0 893 801 A1 | 1/1999 |
| EP | 0 928 680 A1 | 7/1999 |
| EP | 0 928 702 A1 | 7/1999 |
| EP | 0 969 040 A1 | 1/2000 |
| EP | 1 029 874 A1 | 8/2000 |
| EP | 1 031 604 A2 | 8/2000 |
| EP | 1 050 547 A1 | 11/2000 |
| EP | 1 063 246 A1 | 12/2000 |
| EP | 1 077 223 A1 | 2/2001 |
| EP | 1 110 690 A2 | 6/2001 |
| GB | 1 076 873 | 7/1967 |
| GB | 1 361 241 | 7/1974 |
| GB | 1 389 342 | 4/1975 |
| GB | 1 439 247 | 6/1976 |
| GB | 2 360 288 | 9/2001 |
| JP | 49-099138 | 9/1974 |
| JP | 51-151744 | 12/1976 |
| JP | 62-297345 | 12/1987 |
| JP | 04-276407 | 10/1992 |
| JP | 5-032827 | 2/1993 |
| JP | 05-154835 | 6/1993 |
| JP | 7-265358 | 10/1995 |
| JP | 08-309741 | 11/1996 |
| JP | 10-182894 | 7/1998 |
| JP | 10-212372 | 8/1998 |
| JP | 10-231379 | 9/1998 |
| JP | 11-60815 | 3/1999 |
| JP | 11-106573 | 4/1999 |
| JP | 2000-16009 | 1/2000 |
| JP | 2000-38477 | 2/2000 |
| JP | 2000-127711 | 5/2000 |
| JP | 2000-313205 | 11/2000 |
| JP | 2001-123026 | 5/2001 |
| JP | 2002-003659 | 1/2002 |
| JP | 2004-523642 | 8/2004 |
| RU | 2109569 | 4/1998 |
| RU | 2154949 | 8/2000 |
| SU | 1468587 | 3/1989 |
| WO | WO 92/00333 | 1/1992 |
| WO | WO 93/19107 | 9/1993 |
| WO | WO 93/25591 | 12/1993 |
| WO | WO 97/15583 | 5/1997 |
| WO | WO 99/12997 | 3/1999 |
| WO | WO 00/24478 | 5/2000 |
| WO | WO 00/26268 | 5/2000 |
| WO | WO 00/62990 | 10/2000 |
| WO | WO 00/69930 | 11/2000 |
| WO | WO 01/12708 A1 | 2/2001 |
| WO | WO 01/49785 A1 | 7/2001 |
| WO | WO 02/083432 | 10/2002 |

OTHER PUBLICATIONS

Gupta et al., "Metallocene Complexes of Group 4 Elements in the Polymerization of Monoolefins" J.M.S.—Rev. Macromol. Chem. Phys., C34(3), pp. 439-514 (1994).

Möhring, Petra C. et al., "Homogeneous Group 4 metallocene Ziegler-Natta catalysts: the influence of cyclopentadienyl-ring substituents", Journal Organometallic Chemistry, 479, pp. 1-29, (1994).

Wild, L. et al., "Determination of Branching Distributions in Polyethylene and Ethylene Copolymers", Journal of Polymer Science: Polymer Physics Edition, vol. 20, pp. 441-455, (1982).

Chen et al.; "Constrained Geometry' Dialkyl Catalysts. Efficient Syntheses, C-H Bond Activation Chemistry, Monomer-Dimer Equilibration, and α-Olefin Polymerization Catalysis", Organometallics, vol. 16, No. 16, pp. 3649-3657, (1997).

Woo et al.; "Combined Static and Dynamic Density Functional Study of the Ti(IV) Constrained Geometry Catalyst (CpSiH$_2$NH)TiR$^+$. 1. Resting States and Chain Propagation", J. American Chemical Society, vol. 118, No. 51, pp. 13021-13030, (1996).

Chen et al.; "Organo-Lewis Acids As Cocatalysts in Cationic Metallocene Polymerization Catalysis. Unusual Characteristics of Sterically Encumbered Tris(perfluorobiphenyl)borane,"J. American Chemical Society, vol. 118, No. 49, pp. 12451-12452, (1996).

Herrmann et al.; "Synthesis and Characterization of Bridged Half-sandwich Amides of Titanium and Zirconium", Journal of Organometallic Chemistry, vol. 482, pp. 169-181, (1994).

Shapiro et al.; "Model Ziegler-Natta α-Olefin Polymerization Catalysts Derived form [{($\eta^5$-$C_5Me_4$)$SiMe_2$($\eta^1$-$NCMe_3$)}($PMe_3$)Sc($\mu_2$-H)]$_2$and [{($\eta^5$-$C_5Me_4$)$SiMe_2$($\eta^1$-$NCMe_3$)} Sc($\mu_2$-$CH_2CH_2$$CH_3$)]$_2$. -Synthesis, Structures, and Kinetic and Equilibrium Investigations of the Catalytically Active Species in Solution", J. American Chemical Society, vol. 116, No. 11, pp. 4623-4640, (1994).

Shapiro et al.; "[{($\eta^5$-$C_5Me_4$)$Me_2Si$ ($\eta^1$-$NCMe_3$)}($PMe_3$)ScH]$_2$: A Unique Example of a Single-Component α-Olefin Polymerization Catalyst", Organometallics, vol. 9, No. 3, pp. 867-869, (1990).

Soga et al.; "Structures of polyethylene and Copolymers of Ethylene with 1-Octene and Oligoethylene Produced with the $Cp_2ZrCl_2$ and [($C_5Me_4$)$SiMe_2$N(t-Bu)]$TiCl_2$ Catalysts", Macromol. Chem. Phys. vol. 197, pp. 4237-4251 (1996).

Chen et al.; "Large Strain Stress Relaxation and Recovery Bahavior of Amorphous Ethylene-Styrene Interpolymers", Macromolecules, vol. 32, No. 22, pp. 7587-7592, (1999).

Oliva et al.; "Zirconocene-Based Catalysts for the Ethylene-Styrene Copolymerization: Reactivity Ratios and Reaction Mechanism", Macromolecules, vol. 30, No. 19, pp. 5616-5619, (1997).

Oliva et al.; "Copolymerization of Ethylene and Styrene to a Nearly-Alternating Crystalline Copolymer", Macromol. Rapid Commun. vol. 17, pp. 745-748 (1996).

Brintzinger et al.; "Stereospecific Olefin Polymerization with Chiral Metallocene Catalysts", Angew. Chem. Int. Ed. Engl., vol. 34, pp. 1143-1170, (1995).

J. Huang et al.; "Ziegler-Natta Catalysts for Olefin Polymerization: Mechanistic Insights From Metallocene Systems", Prog. Polym. Sci., vol. 20, pp. 459-526, (1995).

Kaminsky et al.; "Metallocenes for Polymer Catalysis", Advances in Polymer Science, vol. 127, pp. 143-187, (1997).

Jordan; "Chemistry of Cationic Dicyclopentadienyl Group 4 Metal-Alkyl Complexes", Advances in Organometallic Chemistry, vol. 32, pp. 325-387, (1991).

Sinn et al.; "Ziegler-Natta Catalysis", Advances in Organometallic Chemistry, vol. 18, pp. 99-149, (1980).

Galimberti et al.; "Random Ethene/Propene Copolymerization from a Catalyst System Based on a "constrained geometry" Half-sandwich Complex", Macromol. Rapid Commun. vol. 20, No. 4, pp. 214-218, (1999).

Xu et al.; "Ethylene Copolymerization with 1-Octene Using a 2-Methylbenz[e]indenyl-Based ansa-Monocyclopentadienylamido Complex and Methylaluminoxanes Catalyst", Macromolecules, vol. 31, No. 15, pp. 4724-4729, (1998).

Honda et al., "Olefin—aromatic viinyl compound copolymer—containing rubber compositions and their tough moldings," Chemical Abstracts, 132: 294994h of JP 2000 119,457, (1998).

Longo et al.; "Copolymerization of Styrene and Ethylene in the Presence of Different Syndiospecific Catalysts", Makromol. Chem. vol. 191, pp. 2387-2396, (1990).

Galimberti et al.; "Metallocenes as Catalysts for the Copolymerization of Ethene with Propene and Dienes", Methallocene-based Polyolefins, John Wiley & Sons, Ltd, vol. 1, Chapter 14, pp. 309-343, (1999).

English language Abstract of DE 196 19 509 A1.
English language Abstract of EP 0 242 840 A1.
English language Abstract of EP 0 501 227 A1.
English language Abstract of EP 0 728 797 A1.
English language ESP@CENET Abstract of JP 5-032827.
English language ESP@CENET Abstract of JP 7-265358.
English language Abstract of JP 10-182894.
English language Abstract of JP 10-212372.
English language Abstract of JP 10-231379.
Machine translation and English language Derwent Abstract of JP 11-60815.
English language Abstract of JP 11-106573.
English translation of JP 2000-38477.
English language ESP@CENET Abstract of JP 2001-123026.
Co-pending U.S. Appl. No. 10/474,430, Title: Tyre Comprising an Ethylene Copolymer, Tread Band and Elastomeric Composition Used Therein; filed Oct. 9, 2003.
Office Action in co-pending U.S. Appl. No. 10/474,430 dated Jun. 8, 2007.
Office Action in co-pending U.S. Appl. No. 10/474,430 dated Aug. 22, 2006.
Office Action in co-pending U.S. Appl. No. 10/474,430 dated Mar. 6, 2006.
Declaration under 37 CFR 1.132 submitted in co-pending U.S. Appl. No. 10/474,430 dated Apr. 27, 2007.
Office Action in copending U.S. Appl. No. 10/474,430 dated Feb. 11, 2008.
Office Action in copending U.S. Appl. No. 10/474,430 dated Oct. 17, 2007.
International Search Report for PCT/EP02/03942 dated Aug. 13, 2002, related to U.S. Appl. No. 10/474,430.
International Preliminary Examination Report for PCT/EP02/03942 dated Jan. 22, 2003, related to U.S. Appl. No. 10/474,430.
Copending U.S. Appl. No. 10/474,639, Title: Product in Subdivided Form for Preparing Crosslinkable Elastomeric Compositions; filed May 10, 2004.
Office Action in copending U.S. Appl. No. 10/474,639 dated Dec. 12, 2007.
Advisory Action in copending U.S. Appl. No. 10/474,639 dated Aug. 29, 2007.
Office Action in copending U.S. Appl. No. 10/474,639 dated May 2, 2007.
Office Action in copending U.S. Appl. No. 10/474,639 dated Oct. 13, 2006.
Office Action in copending U.S. Appl. No. 10/474,639 dated Apr. 26, 2006.
International Search Report for PCT/EP02/03943 dated Aug. 30, 2002, related to U.S. Appl. No. 10/474,639.
International Preliminary Examination Report for PCT/EP02/03943 dated Aug. 22, 2003, related to U.S. Appl. No. 10/474,639.
Copending U.S. Appl. No. 10/484,494, Title: Process and Apparatus for Continuously Producing an Elastomeric Composition; filed Jul. 28, 2004.
Office Action in copending U.S. Appl. No. 10/484,494, dated Jan. 23, 2008.
International Search Report for PCT/EP02/08145 dated Sep. 25, 2002, related to U.S. Appl. No. 10/484,494.
International Preliminary Examination Report for PCT/EP02/08145 dated May 15, 2003, related to U.S. Appl. No. 10/484,494.
Abstract of JP 49-099138.
Abstract of JP 51-151744.
Abstract of JP 08-309741.
Abstract of JP 04-276407.
Abstract of RU 2109569.
Abstract of RU 2154949.
Abstract of SU 1468587.
Office Action in copending U.S. Appl. No. 10/474,430 dated Sep. 19, 2008.
Office Action in copending U.S. Appl. No. 10/474,639 dated Sep. 17, 2008.
Office Action in copending U.S. Appl. No. 10/484,494 dated Oct. 28, 2008.
Burskov D.M., "Machines and apparatuses for rubber production" (1975).

* cited by examiner

PROCESS AND APPARATUS FOR CONTINUOUSLY PRODUCING AN ELASTOMERIC COMPOSITION

CROSS-REFERENCE TO RELATED APPLICATIONS

This application is a national-phase entry under 35 U.S.C. §371 from International Application No. PCT/EP02/13710, filed Dec. 4, 2002, in the European Patent Office, the content of which is relied upon and incorporated herein by reference; additionally, Applicants claim the right of priority under 35 U.S.C. §119(a)-(d) based on patent application No. 01130165.2, filed Dec. 19, 2001, in the European Patent Office; further, Applicants claim the benefit under 35 U.S.C. §119(e) based on provisional application No. 60/342,368, filed Dec. 27, 2001, in the U.S. Patent and Trademark Office.

BACKGROUND OF THE INVENTION

1. Field of the Invention

The present invention relates to a process and an apparatus for continuously producing an elastomeric composition. More particularly, the present invention relates to a process and apparatus for continuously producing an elastomeric composition by means of at least one extruder, the resulting elastomeric composition being primarily, but not exclusively, intended for use in the production of tyres.

2. Description of the Related Art

Conventionally, the production of elastomeric compositions (in the following also indicated as "rubber mixtures") is performed batchwise by means of internal mixers, usually Banbury mixers having two counter-rotating rotors which exert an intensive mixing action to masticate the rubber ingredients and to incorporate and thoroughly disperse therein the other ingredients such as fillers, lubricating aids, curatives and auxiliary substances.

The compounding process using internal mixers shows many drawbacks, particularly a poor heat dissipation and thus a scarce temperature control, mainly due to an unfavourable ratio between material volume and mixer surface area. To improve dispersion in the rubber base, the various ingredients, and particularly the fillers, are incorporated into the rubber base in batches distributed in a plurality of mixing operations separated by cooling and stocking steps. Temperature sensitive ingredients, such as cross-linking agents and accelerators, are added only during the final mixing step after cooling the rubber mixture below a predetermined temperature (usually below 110° C.) to avoid scorching.

Therefore, the compounding process in internal mixers, although still remaining the most widely used mixing process in the rubber industry, is time and energy consuming and does not guarantee an effective control on the characteristics of the resulting elastomeric compositions, particularly as regards dispersion homogeneity of fillers into the rubber base. Variation in the added amounts of individual ingredients timing of addition and discharge from the mixers, initial temperature of the raw materials, and fluctuations of shear forces inside the material during mixing, all contribute to batch-to-batch variation.

To overcome the limitations of the discontinuous processes, many attempts have been performed by the rubber industry to set up continuous compounding processes, based on extrusion techniques analogous to those commonly employed in the processing of thermoplastic polymer materials. Continuous mixing processes carried out by means of an extruder should improve uniformity in the rubber mixture characteristics, better thermal management resulting from improved surface-to-mass ratios, and possible development of highly automated operations. For an overview on this subject see the article "A tale of continuous development" by H. Ellwood, published in *European Rubber Journal*, March 1987, pages 26-28.

U.S. Pat. No. 4,897,236 discloses a process and an apparatus for continuously producing a rubber mixture, wherein the ingredients of the mixture are fed, masticated and homogenized in a twin-screw extruder. The resulting mixture is divided into a first and a second portion. The first portion is discharged, while the second portion is recycled for further homogenization and for mixing with fresh batches of the ingredients being fed into the extruder. The recycled portion is circulated to and returned from a cooled, annular chamber exterior to the extruder chamber, said annular chamber having outflow and inflow passages communicating with the interior of the extruder. That partial recycling of the rubber mixture should compensate for fluctuations in the metering of the ingredients and for local inhomogeneities which may occur. Moreover, the intensive cooling of the recycled portion in the annular chamber should correct a rising processing temperature, and should improve the dispersing action because of increased shearing stresses consequent to the temperature decrease.

U.S. Pat. No. 5,302,635 discloses a method and apparatus for continuously producing a rubber composition. In a first step, crude rubber is continuously fed into a twin-screw extruder, added with non-reactive additives (oils and fillers) and the resulting mixture is plasticated and homogenized by the extruder screws. During that first step, the mixture is kept at a temperature of from 100° C. to 160° C. Then, in a second step, the resulting mixture is cooled to a temperature of from 100° C. to 120° C. and reactive additives (particularly sulfur and vulcanization accelerators) are fed and incorporated into the rubber mixture. The homogenized rubber composition then leaves the extruder via the extruder outlet opening.

The process can be carried out according to different extruder configurations. For instance, the two mixing steps can be performed in a single twin-screw extruder having two distinct mixing zones operating at two different temperatures. Alternatively, the first step may be carried out in a first twin-screw extruder operating at 100° C.-160° C.; the resulting base composition is then fed directly to a second twin-screw extruder operating at 100° C.-120° C. According to another embodiment, the process may be performed in a single extruder having two screw pairs driven at mutually opposite ends of the extruder housing, the two screw pairs operating at different temperatures.

U.S. Pat. No. 5,158,725 discloses a method for continuously producing elastomer compositions which comprises: feeding an elastomer into a twin-screw extruder; feeding at least one filler, oil and/or other elastomers into the extruder; mixing the ingredients to provide a homogeneous mixture which is maintained at a Mooney viscosity ML(1+4) at 100° C. between 20 and 250 during mixing; discharging the resulting mixture from the extruder. Precise volumetric or loss-in-weight feeders are used to meter the elastomer and other ingredients into the extruder. After leaving the extruder, the compounded rubber may be extruded through a die, calendered into sheets, strips or strands, or may be pelletized. The continuous method is less expensive than the multi-step batchwise processes currently used in the art and requires less manpower and less material handling. Moreover, improved dispersion and homogeneity of the resulting elastomeric compositions would result.

U.S. Pat. No. 5,262,111 discloses a process for the continuous production of a rubber composition in a twin-screw extruder. Rubber is fed into the extruder together with a processing aid and masticated up to a temperature of 120° C. to 180° C. Subsequently, a first part of carbon black, representing preferably 40-80% of the whole quantity of carbon black, is fed into the heated extrudate. Afterwards, plasticizing oil is added to the extrudate before the second remaining carbon black part is fed and incorporated into the extrudate at a temperature of from 120° C. to 180° C. The whole composition is then cooled to a temperature of from 100° C. to 120° C., a crosslinking agent is added, and the composition is homogenized and extruded. The process would improve the dispersion of carbon black in the extrudate while reducing the specific energy requirement.

U.S. Pat. No. 5,626,420 discloses a continuous mixing process and apparatus, wherein base elastomer(s) and other components are continuously dosed and introduced into a mixing chamber formed of a stator and a rotor rotating therein, preferably a single screw extruder. The introduced components advance within the mixing chamber along zones of propulsion and mixing. To improve dispersion and homogenizing of the rubber components, the filling rate of the mixing chamber in at least certain mixing zones is lower than 1. To properly introduce the components, and particularly the rubber base, into the mixing chamber, force feeding means are used, such as volumetric pumps (e.g. gear pumps). To obtain precise dosage of the different components, it may be desirable to add the components in a mixing zone where the filling rate is equal to 1, located between two mixing zones having a filling rate lower than 1.

U.S. Pat. No. 5,374,387 describes a process for continuously producing elastomeric compositions using a twin-screw extruder, which comprises the following sequential steps. In a first mixing zone of the extruder an elastomeric material is added, sheared and heated to a first operating temperature (typically from 130° C. to 220° C.) while reducing viscosity. Then the elastomeric material is passed in a second mixing zone where it is added with at least a first portion of a reinforcing filler and processing aid, while simultaneously cooling the rubber mixture to a second operating temperature (typically from 110° C. to 160° C.). The resulting mixture is then passed to an optional third mixing zone, where small constituent chemicals, such as adhesion promoters, anti-ozonants, color additives, fire retardants and the like, are introduced into the rubber mixture. Preferably, in said third mixing zone a second portion of the reinforcing filler and processing aid is added so as to reach a third operating temperature (typically from 85° C. to 130° C.). Then, in a fourth mixing zone the rubber mixture is supplemented with the vulcanization agent at a fourth operating temperature (typically from 115° C. to 150° C.). The mixture flow is then directed through a delivery zone (fifth zone) wherein the mixture flow is extruded into the desired form through some sort of die slot or the like. The various components of the rubber composition are continuously and individually metered to the extruder, preferably in the form of particulated materials and/or liquids by means of weight loss feeders.

U.S. Pat. No. 5,711,904 discloses a method for continuous mixing of elastomeric compositions reinforced with silica. A twin-screw extruder is fed with the elastomeric material, then with silica and other compounding ingredients, including a silica coupler. Temperature and pressure along the extruder are controlled to enable the silica coupler to react with the silica and the elastomeric material. Then curatives and accelerators are added, while maintaining the mixture at a Mooney viscosity ML(1+4) at 100° C. between 20 and 250. The mixing is continued for a time sufficient to thoroughly mix the curatives and accelerators. The resulting elastomeric composition is then forced through a suitable die mounted at the extruder exit. The overall process may be performed using a single extruder or a sequence of extruders. Preferably, residence time is increased in a first twin-screw extruder and then the composition is cooled, ground and dumped into a second twin-screw extruder where the rubber mix is completed with curatives and other ingredients. The different extruders may be separate independent entitites or may be coupled to each other to form one continuous process. The extruders may be closely coupled in a cross-head extruder mounting, or may be more loosely connected, for instance via festoons or belts that convey the material from one unit to the other.

The Applicant has noted that, in a process for continuously producing an elastomeric composition by means of at least one extruder, the resulting elastomeric composition may not have a uniformity of properties as would be expected taking into account the very good control of the processing conditions achievable during extrusion.

In other words, the Applicant has found that the elastomeric composition obtained from a prior art continuous process is not satisfactory in terms of consistency of the physical-chemical properties, said properties varying from sample to sample even within the same production campaign.

Said aspect is particularly critical since the above variations of properties within the same production campaign cause corresponding variations of performance in the finished product.

SUMMARY OF THE INVENTION

The Applicant has perceived that the above lack of consistency is mainly due to fluctuations which may occur during the metering of the plurality of ingredients which are added to produce the elastomeric composition.

In particular, the Applicant has noticed that even little fluctuations in the added amounts of the recipe ingredients can cause remarkable variations in the properties of the final rubber mixture.

The above considerations are of particular relevance when applied to the so called "minor ingredients", i.e. to those components which are different from rubbers, reinforcing fillers and plasticizing agents and which are added to modify and/or to improve the characteristics of the elastomeric compositions. Some examples of said minor ingredients are: vulcanizing agents, vulcanization accelerators and retardants, protective agents, hardening resins.

The addition to the rubber base of the minor ingredients, types and amounts of which vary according to the elastomeric composition to be produced, is particularly critical since the minor ingredients are very numerous (usually at least 5-15 in a single rubber mixture) and used in little amounts (generally not greater than 5% by weight with respect to the total weight of the rubber mixture). Therefore, a very accurate metering of said minor ingredients is rather difficult to be achieved.

Furthermore, the Applicant has found that any fluctuations introduced in the compounding process by the metering system can not be effectively corrected during the extrusion step since the distribution width of the residence times for each elementary portion of the elastomeric composition is not sufficient to mechanically homogenize different elementary portions obtained at different moments of the production process.

By starting from the above perception, the Applicant has found that it is possible to compensate the feed rate errors introduced by the metering system (i.e., to compensate, for each recipe ingredient, the scattering of the measured flow rate value from the set one) by providing the production process with a stirring step downstream of the extrusion phase.

In more details, the Applicant has found that the above stability of the physical-chemical properties of the resulting elastomeric composition can be achieved by converting the elastomeric extrudate into a subdivided product, accumulating an amount of said subdivided product and stirring the same for a time sufficient to compensate for any possible fluctuations in the metering step as well as for any local inhomogeneities which may occur during the production process.

The Applicant has found that said accumulating and stirring steps allow to mechanically homogenize subdivided products which are obtained at different moments of the production process so that any possible fluctuations occured during the metering step can be advantageously compensated.

Therefore, in a first aspect the present invention relates to a process for continuously producing an elastomeric composition, said process comprising the steps of:

metering at least one elastomer, at least one filler and at least one minor ingredient;

feeding said at least one elastomer, at least one filler and at least one minor ingredient into at least one extruder;

mixing and dispersing said at least one filler and at least one minor ingredient into said at least one elastomer by means of said at least one extruder;

obtaining a subdivided product from the resulting elastomeric composition discharged from said at least one extruder;

accumulating an amount of said subdivided product, and stirring said accumulated amount of subdivided product.

According to the present invention, the term subdivided products refers to a product in discrete particles. Preferably, said particles have average dimensions of from 0.5 mm to 15 mm, more preferably from 1 mm to 10 mm, even more preferably from 3 mm to 7 mm. Preferably, said particles are in the form of granules, pellets, beads or pearls.

According to a preferred embodiment, the process of the present invention comprises two mixing and dispersing steps so that an intermediate rubber mixture devoid of temperature sensitive minor ingredients is produced from a first mixing and dispersing step (carried out in a first extruder) and successively submitted, together with the temperature sensitive minor ingredients, to a second mixing and dispersing step (carried out in a second extruder) for producing the completed rubber mixture (i.e., the completed elastomeric composition).

According to a preferred embodiment, the accumulating and stirring steps are carried out dowstream of said first mixing and dispersing step on the intermediate rubber mixture in the subdivided form.

According to a further preferred embodiment, the accumulating and stirring steps are carried out dowstream of said second mixing and dispersing step on the completed elastomeric composition in the subdivided form.

According to a further embodiment, the process of the present invention comprises two mixing and dispersing steps as well as two accumulating and stirring steps so that each mixing and dispersing step is followed by corresponding accumulating and stirring steps.

In a second aspect the present invention relates to an apparatus for continuously producing an elastomeric composition, said apparatus comprising:

at least one extruder comprising a housing, at least one screw rotatably mounted in said housing, said housing including at least one feed opening and a discharge opening;

at least one first metering device to meter and feed into said at least one extruder at least one elastomer and at least one filler through said at least one feed opening;

at least one second metering device to meter and feed into said at least one extruder at least one minor ingredient;

at least one device for obtaining a subdivided product from the resulting elastomeric composition discharged from said discharge opening, and at least an accumulating and stirring device for mixing the accumulated subdivided product.

According to a preferred embodiment of the present invention, the device for obtaining a subdivided product is located at the discharge opening of said at least one extruder so that the extrudate is obtained directly in the subdivided form.

According to a preferred embodiment of the present invention the discharging of the stirred subdivided product is carried out continuously.

According to a further embodiment, the discharging of the stirred subdivided product is performed batchwise at the end of the stirring step by means of at least two stirring devices which are arranged in series so that while a first one is stirring, a second one is loaded with or unloaded from the subdivided product.

According to a further embodiment, the apparatus of the present invention comprises at least two extruders: a first one for mixing and dispersing an intermediate rubber mixture devoid of temperature sensitive minor ingredients, and a second one for mixing and dispersing said intermediate rubber mixture together with the temperature sensitive minor ingredients to obtain the completed elastomeric composition.

According to a preferred embodiment, the stirring device of the present invention is located downstream of said first extruder.

According to a further embodiment, the stirring device of the present invention is located downstream of said second extruder.

According to a further embodiment, the apparatus of the present invention comprises two stirring devices: a first one located dowstream of said first extruder and a second one located dowstream of said second extruder.

According to a preferred embodiment of the present invention, said at least one first and second metering devices of said apparatus are gravimetric feeders.

According to a preferred embodiment of the present invention, said at least one device for obtaining a subdivided product is a granulator or an open mill.

According to a preferred embodiment of the present invention, said at least one stirring device is a rotating drum.

BRIEF DESCRIPTION OF THE DRAWINGS

The present invention is now further illustrated with reference to the attached figures wherein.

DETAILED DESCRIPTION OF THE EXEMPLARY EMBODIMENTS

For simplicity of description, in the appended drawings, the same reference signs correspond to similar or identical components.

Figure 1:
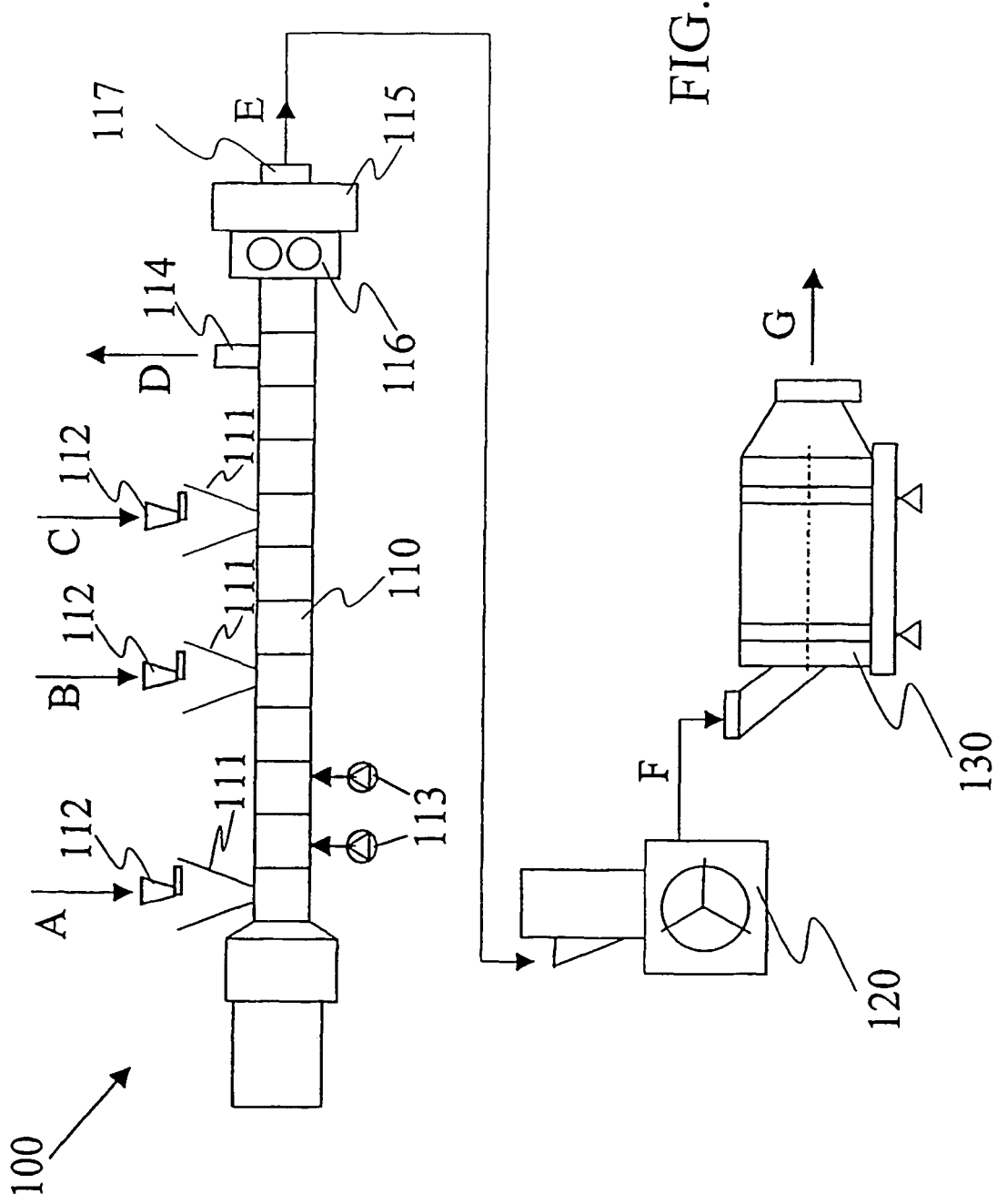
FIG. 1 is a schematic diagram of a continuous production plant of an elastomeric composition according to the present invention.

FIG. 1 shows a schematic diagram of a first embodiment of a continuous production plant 100 of an elastomeric composition according to the present invention.

According to said first embodiment, the production plant 100 comprises an extruder 110 suitable for producing a continuous ribbon E of the desired elastomeric composition, a grinding device 120 suitable for transforming said continuous ribbon E into a subdivided product F, and a stirring device 130 operating on the elastomeric composition in the subdivided form F.

As schematically shown in FIG. 1, by means of feed hoppers 111 the extruder 110 is fed with the recipe ingredients necessary for producing the desired elastomeric composition, said ingredients tipically comprising: rubber base materials, reinforcing fillers and minor ingredients, as defined in the following of the present description.

Generally, the recipe ingredients are fed to different zones of the extruder. For example, FIG. 1 shows three main flows A, B, C in correspondence of three different zones of the extruder 110, the number of said flows depending on the elastomeric composition to be produced.

Furthermore, generally some recipe ingredients are fed to the extruder more than once, for instance the same recipe ingredient can be fed to two distinct zones of the extruder, once again depending on the elastomeric composition to be produced. Therefore, each flow A, B, C of FIG. 1 can comprise more than one recipe ingredient. That is the case, for instance, of the reinforcing fillers (e.g., carbon black, silica) which are preferably introduced at different zones of the extruder so as to improve their dispersion in the rubber base.

For simplicity, FIG. 1 shows only one metering device 112 for each flow A, B, C. However, in the case each flow comprises more than one recipe ingredient, preferably each recipe ingredient is provided with a dedicated metering device. In that way, metering errors which can occur due to the metering of recipe ingredients of different densities can be advantageously reduced.

Alternatively, a plurality of different recipe ingredients may be metered by means of the same metering device.

Preferably, the metering device 112 is a loss-in-weight gravimetric feeder.

Generally, the rubber base materials, which are usually provided by manufacturers in bales, are comminuted in irregular particles (crumbs) of small size (about 3-50 mm as average dimensions), e.g. by means of blades, and then supplemented with an antisticking agent (e.g. chalk, silica, or other powders) to avoid reagglomeration.

Furthermore, gravimetrically controlled feeding pumps 113 are also provided to introduce into the extruder 110 plasticizing oils and possibly other liquid ingredients, such as silica coupling agents (e.g. silanes) and adhesion promoters (e.g. cobalt salts), which are generally added to the rubber base.

FIG. 1 shows also a flow D exiting from the extruder 110 which is generally provided with a degassing unit schematically indicated by reference sign 114.

Preferably, the extruder 110 is a co-rotating twin-screw extruder.

Preferably, before leaving the extruder 110, the elastomeric composition is filtered to eliminate any possible aggregate, metal particles or other impurities. To that purpose, a filtering body 115 (e.g. a screen filter) is placed downstream of the extruder screw (not shown).

In order to impart to the extruded material a pressure sufficient to pass said filtering body 115, preferably the extruder 110 is provided with a gear pump 116. Preferably, said gear pump 116 is placed upstream of the filtering body 111.

With reference to FIG. 1, the elastomeric composition is discharged from the extruder 110 by passing it through an extruder die 117 so that the elastomeric composition is obtained in the form of a continuous elastomeric ribbon E.

According to the embodiment of the present invention shown in FIG. 1, the elastomeric ribbon E is conveyed, by means of any suitable device (e.g., a conveyor belt), to a grinding device 120 that transforms the elastomeric ribbon E into an elastomeric subdivided product F.

Preferably, said grinding device 120 is a grinding mill or a granulator.

Preferably the subdivided product F is submitted to a cooling step.

With reference to the embodiment shown in FIG. 1, the plant 100 for continuously producing an elastomeric composition according to the present invention further comprises a stirring device 130 which is fed with the subdivided product F.

Preferably, the stirring device 130 is a rotating drum.

According to the present invention an amount of subdivided product F exiting from the grinding device 120 is accumulated and stirred within the stirring device 130.

Preferably, the stirring step is carried out by continuously rotating the accumulated amount (e.g. by rotating the drum) so that subdivided products coming out from the grinding device 120 at different times are blended together.

The residence time of an elementary portion of the subdivided product (e.g. a granule) within the stirring device 130 depends on a plurality of parameters such as: a) volume of the stirring device; b) rate flow of the subdivided product F; c) speed of rotation of the drum, in case the stirring device is a rotating drum; d) filling degree of the stirring device.

For example, in the case the stirring device is a rotating drum, the flow rate of the subdivided product is comprised from about 50 kg/h to about 5,000 kg/h, the filling degree is of about 0.5, the drum volume is comprised from about 1 $m^3$ to about 5 $m^3$, and the speed of rotation is comprised from about 5 rpm to about 15 rpm (e.g. 6 rpm), the residence time of the subvided product within the rotating drum is preferably in the range from 5 min to 15 min.

As shown in FIG. 1, at the end of the stirring step the stirred subdivided product G is discharged from the stirring device 130.

Figure 2:
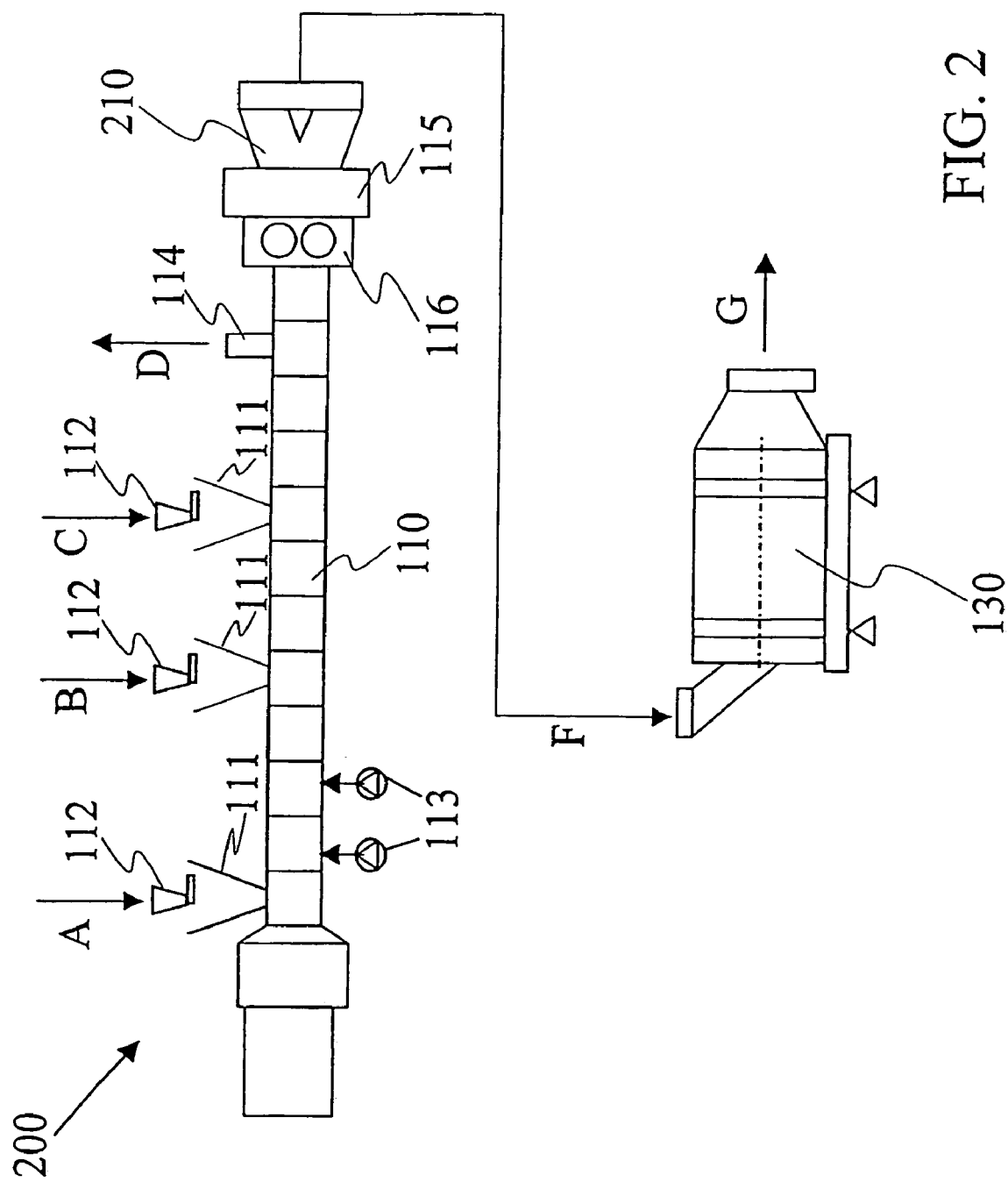
FIG. 2 is a schematic diagram of a further embodiment of the continuous production plant of FIG. 1.

FIG. 2 shows a further embodiment of a continuous production plant 200 of the present invention according to which the step of obtaining an elastomeric composition in the subdivided form is carried out directly at the discharging opening of the extruder 110 so that the grinding device 120 of FIG. 1 can be avoided.

For example, according to said embodiment the elastomeric composition can be granulated at the end of the extrusion step by providing the extrusion head with a perforated die plate 210 through which the elastomeric composition is caused to pass.

The die plate 210 is generally equipped with cutting means (not shown in FIG. 2) so that the elastomeric composition can be obtained in the granular form.

In order to impart to the extruded material a pressure sufficient to pass through said die plate 210, the extruder 110 is provided with a gear pump 116 which is placed downstream of the extruder screw.

Preferably, before passing through the die plate 210, the elastomeric composition is filtered by means of a filtering body 115 (e.g. a screen filter) which is placed downstream of said gear pump 116.

Analogously to the production plant 100 shown in FIG. 1, the elastomeric composition in the subdivided form F is fed to a stirring device 130 so that a stirred subdivided product G is obtained.

Figure 3:
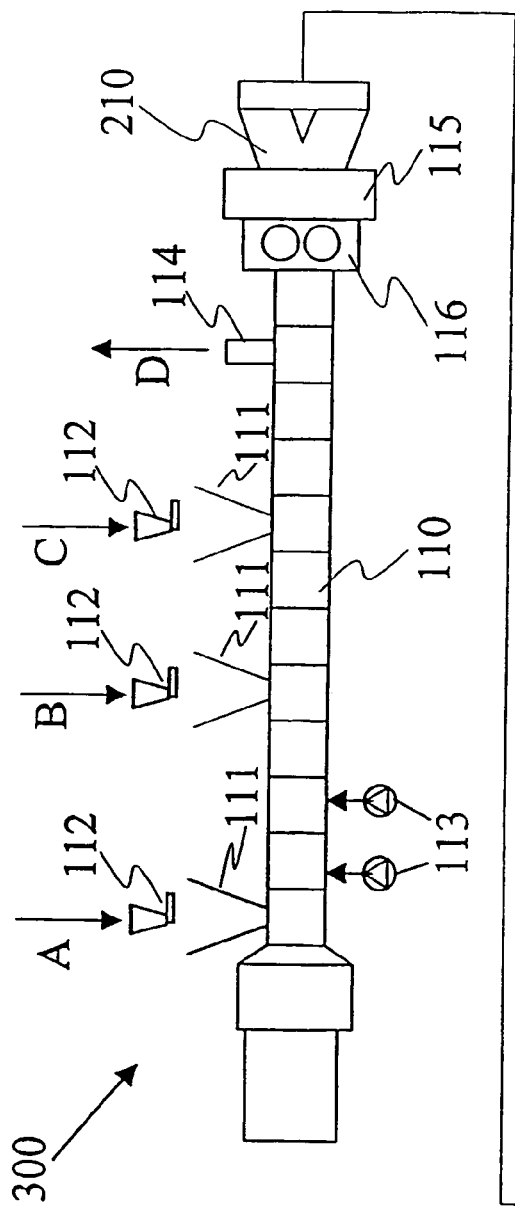
FIGS. 3 to 5 are schematic diagrams of further embodiments of the continuous production plant of the present invention wherein an intermediate elastomeric composition is produced.
Figure 3:
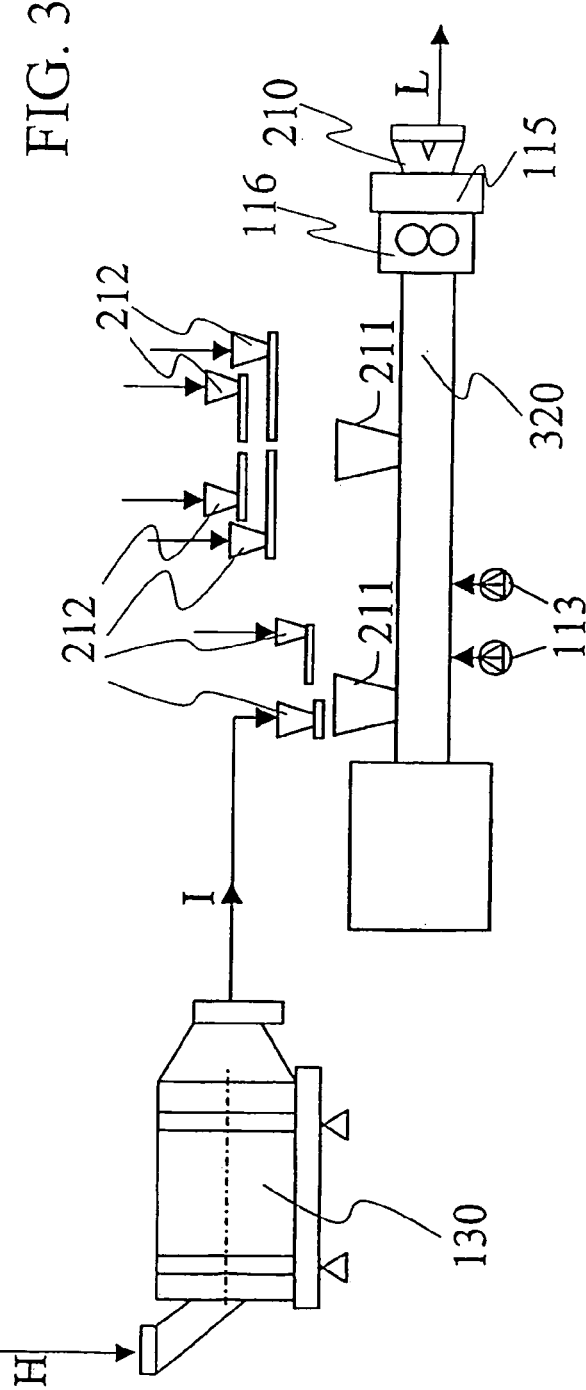

According to a further embodiment of the present invention schematically shown in FIG. 3, a plant 300 for continuously producing an elastomeric composition comprises a first extruder 110 for producing an intermediate elastomeric composition and a second extruder 320 for producing a final curable elastomeric composition from said intermediate elastomeric composition.

According to said further embodiment, an intermediate elastomeric composition is obtained by feeding the first extruder 110 with rubber base materials, reinforcing fillers and minor ingredients which are not temperature sensitive and, therefore, do not degrade and/or cause scorching at the operating conditions and/or do not interfere with the compounding process.

Generally, said not temperature sensitive minor ingredients are all the minor ingredients except for crosslinking agents, crosslinking accelerators, crosslinking retardants and crosslinking activators.

For instance, it is to be avoided to feed the first extruder 110 with those minor ingredients which can interfere with reactions that may occur during the first mixing and dispersing step occurring within said first extruder 110. For example, in the case of silica filled rubber mixtures, zinc derivatives (e.g. ZnO) and amine compounds have not to be added during said first step since they can interfere with the silanization reaction between the coupling agent and silica.

As already described with reference to FIG. 2, before leaving the first extruder 110 the intermediate elastomeric composition is filtered by means of a filtering body 115 (e.g. a screen filter) which is placed downstream of the extruder screw (not shown).

In order to impart to the extruded material a pressure sufficient to pass said filtering body 115, the first extruder 110 is provided with a gear pump 116 which is placed upstream of the filtering body 115.

The intermediate elastomeric composition exiting from the first extruder 110 is transformed into a subvided product H by providing the extrusion head with a perforated die plate 210, as already described with reference to the embodiment of FIG. 2.

According to said further embodiment shown in FIG. 3, the production plant 300 further comprises a stirring device 130 which is fed with the intermediate elastomeric composition in the subdivided form H.

Thus, the output I discharged from the stirring device 130, i.e. the stirred intermediate elastomeric composition, is fed to a second extruder 320, the latter being also fed with the temperature sensitive minor ingredients.

The passage of the intermediate elastomeric composition from the first to the second extruder may be performed according to any known method.

Preferably, during said passage the intermediate elastomeric composition is cooled down to avoid rubber scorching during the second mixing and dispersing step within the second extruder 320.

The stirred granulated intermediate elastomeric composition I is conveyed, e.g. by means of a conveyor belt, to a loss-in-weight gravimetric feeder 212 which meters and feeds it to the second extruder 320 through a feed hopper 211.

Minor ingredients which are necessary to complete the elastomeric composition, i.e. temperature sensitive minor ingredients such as crosslinking agents, crosslinking accelerators and retardants, activating agents, are metered by means of gravimetric feeders 212 and fed to the extruder 320 through one or more feed hoppers 211.

Preferably, each minor ingredient is individually metered by means of a dedicated gravimetric feeder.

As described with reference to the first extruder 110, also the second extruder 320 may be provided with gravimetrically controlled feeding pumps 113 to introduce into the extruder 320 additional plasticizing oils or other liquid ingredients, such as liquid resins (e.g. phenolic resins) and antireversion agents (e.g. silanes).

Analogously to the embodiments described hereinabove, the completed elastomeric composition may be optionally filtered to eliminate any possible aggregates, metal particles or other impurities by means of a filtering body 115.

Preferably, a gear pump 116 is provided upstream of said filtering unit 115. During this optional filtering phase of the completed elastomeric composition particular care should be taken to avoid temperature raising which could cause scorching of the elastomeric composition.

According to said further embodiment shown in FIG. 3, the head of the second extruder 320 is provided with a perforated die plate 210 so that the completed elastomeric composition L is obtained in the subdivided form.

According to a further embodiment (not shown), analogously to the schematic production plant shown in FIG. 1, the completed elastomeric composition is discharged from the second extruder 320 by passing it through an extruder die so that the elastomeric composition can be obtained in the form of a continuous elastomeric ribbon.

Figure 4:
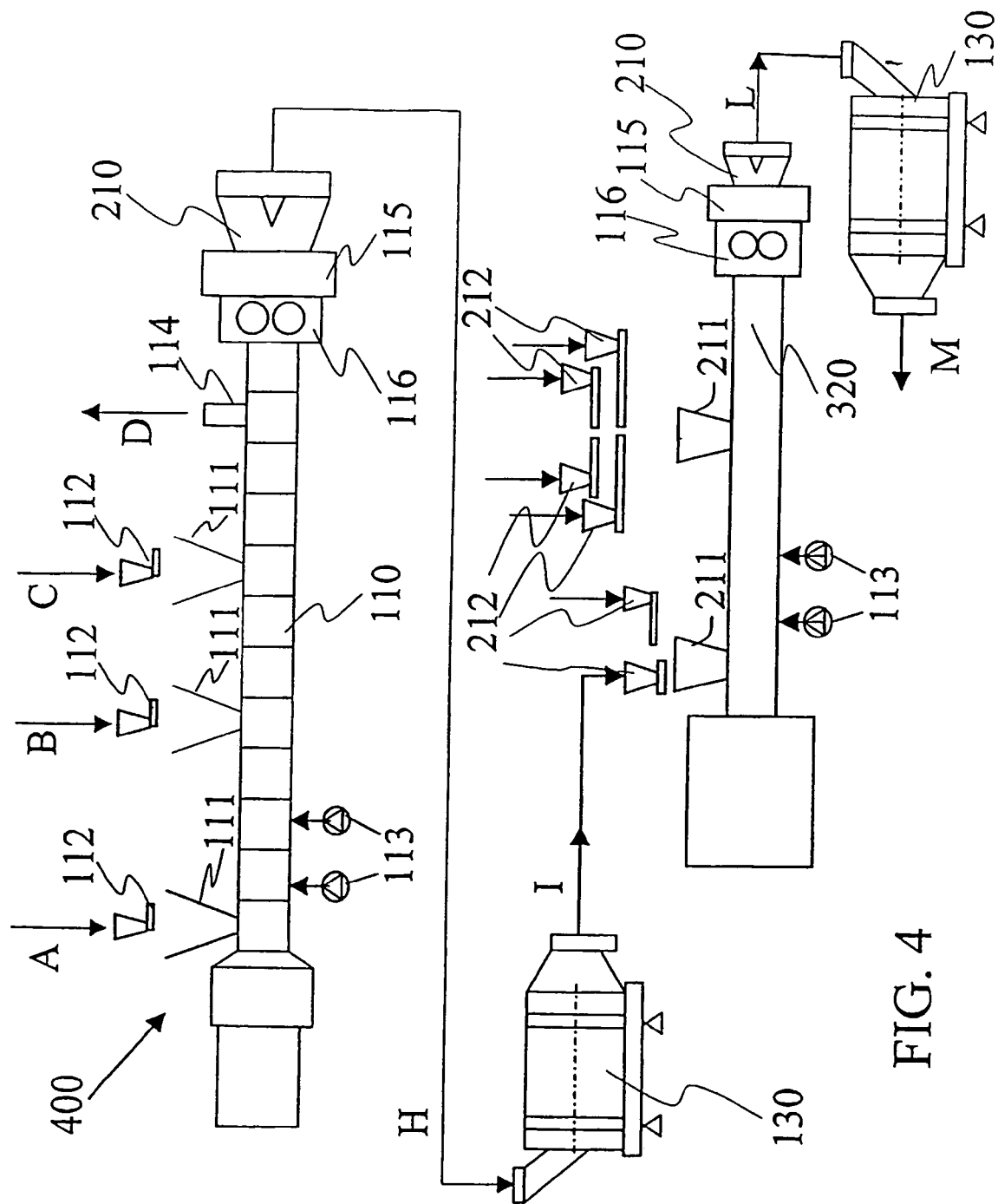

According to a further embodiment shown in FIG. 4 of a production plant 400 according to the present invention, the completed elastomeric composition L obtained in the granular form according to the schematic diagram of FIG. 3 is fed to a stirring device 130 so as to obtain the completed elastomeric composition in the subdivided form M.

Figure 5:
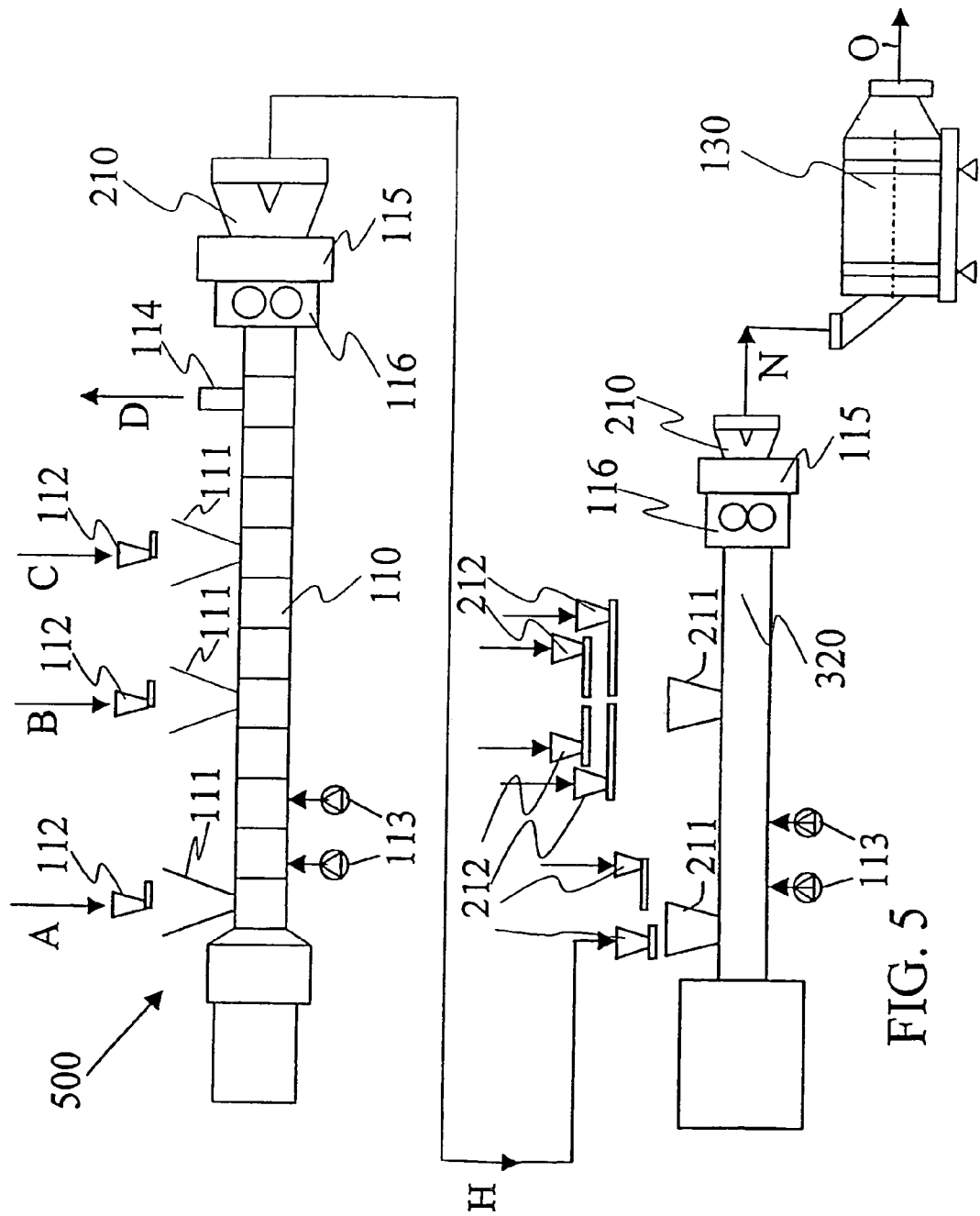

According to a further embodiment shown in FIG. 5 of a production plant 500 according to the present invention, the intermediate elastomeric composition in the subdivided form H exiting from the first extruder 110 is directly fed to the second extruder 320 and no stirring device 130 is provided between the two extruders 110, 320.

According to a preferred embodiment of the present invention, one or more recipe ingredients are fed to the respective metering devices in the subdivided form.

Preferably the minor ingredients are fed in the subdivided form.

According to a further embodiment of the present invention, one or more recipe ingredients are conveyed to respective metering devices by means of a pneumatic conveying line.

When a pneumatic conveying line is used, preferably at least one minor ingredient is provided to the production plant in a subdivided free-flowing form which is particularly suitable for the pneumatic conveying thereof.

Preferably said free-flowing properties as well as high dimensional regularity and stability are obtained by dispersing said at least one minor ingredient in a thermoplastic binding agent.

Moreover, the thermoplastic binding agent readily melts when introduced into the extruder, thus acting as a processing aid and remarkably improving the dispersion of said at least one minor ingredient into the rubber base, without causing any significant changes in the properties of the final elastomeric composition.

Minor ingredients which can be metered and fed to the extruder in the subdivided form may be selected, for instance, from:

(a1) crosslinking agents, such as:
  sulfur (usually in a soluble crystalline form or in a insoluble polymeric form, optionally dispersed in an oily phase); sulfur donors (e.g. alkylthiuram disulfides); organic peroxides;
(a2) crosslinking accelerators, such as:
  thiazoles, sulfenamides, guanidines, thiurams, dithiocarbamates, amines, xanthogenates;
(a3) synthetic resins, such as alpha-methylstyrene resins, cumarone resins;
(a4) crosslinking activators, such as zinc compounds (e.g. ZnO, $ZnCO_3$, fatty acid zinc salts);
(a5) crosslinking retardants, such as carboxylic acids, phthalimide derivatives, diphenylamine derivatives;
(a6) adhesion promoters, such as hexamethylentetramine (HMT), resocinol;
(a7) protective agents, such as aromatic diamines (e.g. N-(1,3-dimethylbutyl)-N'-p-phenylendiamine (6PPD)), dihydrochinoline derivatives, imidazole derivatives;
(a8) coupling agents, such as coupling agents for silica, particularly sulfur-containing hydrolyzable silanes (e.g. 3,3'-bis(triethoxysilylpropyl)tetrasulfide (TESPT));
(a9) condensation catalysts, such as metal carboxylates (e.g. dibutyltindilaurate (DBTL)).

The above list is given only to illustrate some examples of the most common minor ingredients used in rubber mixtures, particularly in rubber mixtures for tyres, and shall not be intended as limitative of the scope of the present invention.

The process according to the present invetion may be employed to produce rubber mixture of any kind of elastomers, particularly of elastomers used in the tyre industry. Generally, the elastomeric base may be selected from: diene elastomeric polymers and mono-olefin elastomeric polymers, or mixtures thereof.

Diene elastomeric polymers are generally of natural origin, or may be obtained by polymerization, in solution or in emulsion, of at least one conjugated diolefin, optionally with at least one monovinylarene in an amount not exceeding 50% by weight. Examples of diene elastomeric polymers are: cis-1, 4-polyisoprene (either natural or synthetic, preferably natural rubber), 3,4-polyisoprene, poly-1,3-butadiene (in particular, high vinyl poly-1,3-butadiene having a content of 1,2-polymerized units of from 15% to 85% by weight), polychloroprene, optionally halogenated isoprene/isobutene copolymers, 1,3-butadiene/acrylonitrile copolymers, 1,3-butadiene/styrene copolymers, 1,3-butadiene/isoprene copolymers, isoprene/styrene copolymers, isoprene/1,3-butadiene/styrene terpolymers; or mixtures thereof.

As to mono-olefin elastomeric polymers, they may be selected from: copolymers of ethylene with at least one alpha-olefin having from 3 to 12 carbon atoms, and optionally with a diene having from 4 to 12 carbon atoms; polyisobutene; copolymers of isobutene with at least one diene. Particularly preferred are: ethylene/propylene copolymers (EPR); ethylene/propylene/diene terpolymers (EPDM); polyisobutene; butyl rubbers; halobutyl rubbers; or mixtures thereof.

The rubber mixture further comprises at least one reinforcing filler, such as: carbon black, silica, alumina, aluminosilicates, calcium carbonate, kaolin, titanium dioxide, or mixtures thereof. Particularly preferred are carbon black and silica, or mixtures thereof. The amount of the reinforcing filler may be generally of from 0.1 to 120 phr, preferably from 20 to 90 phr (phr=parts by weight per 100 parts by weight of total elastomeric base).

To improve processability, at least one plasticizing agent is preferably added to the rubber mixtures. It is generally selected from mineral oils, vegetable oils, synthetic oils and the like, or mixtures thereof, for instance: aromatic oil, naphthene oil, phthalates, soybean oil, or mixtures thereof. The amount of the plasticizing agent may generally range from 2 to 100 phr, preferably from 5 to 50 phr.

The present invention is now further illustrated by the following working examples.

Example 1

Invention

An elastomeric composition was produced according to the schematic production process of FIG. 1.

Said elastomeric composition was prepared by using natural rubber (NR) and butadiene rubber (BR) as elastomeric base, and carbon black as reinforcing filler.

The recipe of the elastomeric composition is reported in Table 1 hereinbelow.

TABLE 1

| Ingredients | phr |
| --- | --- |
| NR (STR 20) | 50 |
| BR (polibutadiene Bune Cis-132-Bayer) | 50 |
| Carbon Black N660 | 50 |
| Minor Ingredients | |
| Zinc Oxide | 3 |
| Wax | 2 |
| Stearic Acid | 2 |
| N-tertbutyl-mercaptobenzothiazyl sulphenamide (TBBS) | 0.8 |
| Insoluble sulfur ($S_n$) | 1.8 |
| N-cyclohexyl thiophtaloimide (PVI) | 0.3 |
| Antioxidant (6PPD) | 2.5 |
| Total | 162.4 |

The term "phr" indicates the parts by weight per 100 parts by weight of total rubber.

The natural rubber and the butadiene rubber were obtained in the form of granules, having an average particle size of about 1 cm, by means of two mills provided with rotating blades.

In order to prevent reagglomeration, the obtained granules of the two rubbers were dusted with silica.

Successively, a mechanical blending of the granules of the two rubbers was carried out and the blended granules of the two different rubbers were fed to a first feeding hopper (the main hopper) of a co-rotating intermeshing twin-screw extruder having a cylinder diameter of 58 mm and a L/D ratio of 48.

The feeding of said blended granules to the twin-screw extruder was carried out by means of a gravimetric feeder.

The minor ingredients in the form of powders were introduced at different zones of the twin-screw extruder.

About 50% by weight of the reinforcing filler, i.e. of the carbon black, was fed together with the granulated rubbers to the first feeding hopper of the twin-screw extruder by means of a dedicated gravimetric feeder.

The remaining part of carbon black as well as zinc oxide, wax and stearic acid were fed to a second feeding hopper of the twin-screw extruder by means of a different dedicated gravimetric feeder, i.e. a gravimetric feeder for each ingredient.

Insoluble sulphur, N-cyclohexyl thiophtaloimide (PVI) and N-tertbutyl mercaptobenzothiazyl sulphenamide (TBBS), i.e. the curatives, were fed to a further feeding hopper of the twin-screw extruder by means of dedicated gravimetric feeders.

Antioxidant 6PPD was injected in the molten state by means of a gravimetrically controlled feeding pump.

In order to determine the weight errors introduced by the feeding gravimetric system into the production process, each gravimetric feeder was provided with an on-line electronic control device which measured and displayed the instant flow of the recipe ingredient. If necessary, said control was able to correct the instant flow by acting on the feeding mechanism of the gravimetric feeder.

From the values measured by the control device, for each recipe ingredient the Applicant calculated the scattering of the flow values from the set ones.

The results of said calculations are reported in Table 3.

TABLE 2

| Ingredient | Feeding flow (kg/h) | Scattering coefficient V (%) |
|---|---|---|
| NR and BR blended granules | 93.74 | 0.85 |
| First portion of the filler | 32.77 | 1.05 |
| Additives (Zinc oxide, wax, stearic acid) | 9.31 | 8.21 |
| Second portion of the filler | 14.01 | 2.45 |
| Curatives | 6.95 | 6.85 |
| Total | 157 | | wherein the scattering coefficient V is calculated as follows:

$$V = \frac{\sigma}{\bar{x}} \quad (1)$$

or $$V\% = 100 * \frac{\sigma}{\bar{x}} \quad (2)$$

wherein:

$\bar{x}$ is the arithmetical mean of the measured values of the property x for all the samples, i.e.:

$$\bar{x} = \frac{1}{N} \sum_{i=1}^{N} x_i \quad (3)$$

N is the total number of samples which have been considered; and $\sigma$ is the root-mean-square deviation that is calculated as follows:

$$\sigma = \sqrt{\frac{\sum_{i=1}^{N}(x_i - \bar{x})^2}{N-1}} \quad (5)$$

Since the scattering coefficient V is directly proportional to the root-mean-square deviation $\sigma$, the greater is the value of V, the greater is the value of $\sigma$, i.e. the greater is the amplitude of the Gaussian curve centered in correspondence of the average value $\bar{x}$. Of course, the greater is the value of V, the greater are the weight errors introduced into the production process by the feeding system.

As shown in Table 2, the greatest values of the scattering coefficient V are for the minor ingredients (additives+curatives), thus making the gravimetric feeding system particularly critical for said ingredients. The extruded elastomeric composition was in the form of a continuous ribbon having width of about 10 cm and thickness of about 2 cm.

Said ribbon was fed to a mill provided with rotating blades so as to pelletize said ribbon in order to obtain elastomeric granules having average particle size of about 1 cm.

100 kg of elastomeric composition in the granular form was produced and dusted with silica in order to prevent reagglomeration.

Successively, said granules amount was fed to a rotating drum having a capacity of 1,500 litres and stirred for 10 minutes at a rotation speed of about 25 rpm so as to homogenize the pettetized extrudate.

At the end of the stirring step, the rotating drum was stopped and discharged. During the discharging step seven samples of granules (each sample was of about 500 g by weight) were collected and charged into an open mill so as to obtain an elastomeric composition in the form of a ribbon.

Some samples were obtained from said ribbon and submitted to a curing step for 10 minutes at 170° C. Successively said samples were tested to evaluate the following properties:

Mooney viscosity ML(1+4) at 100° C. according to Standard ISO 289/1;

mechanical properties (100% Modulus, 300% Modulus, stress at break, elongation at break) according to ISO standard 37;

dynamic elastic properties, and hardness in IRHD degrees at 23° C. and 100° C. according to ISO standard 48.

In Table 3 are reported the arithmetical mean values for each property of the tested samples.

The dynamic elastic properties were measured with a dynamic Instron device in the compression mode according to the following method. A test piece of the above crosslinked material in a cylindrical form (length=25 mm; diameter=14 mm), compression-preloaded up to a 10% longitudinal deformation with respect to the initial length and kept at the prefixed temperature (70° C. or 23° C.) for the whole duration of the test, was submitted to a dynamic sinusoidal strain having an amplitude of ±3.33% with respect to the length under pre-load, with a 100 Hz frequency. The dynamic elastic properties were expressed in terms of dynamic elastic modulus (E') and tandelta (loss factor) values. The tandelta value was calculated as a ratio between the viscous modulus (E") and the elastic modulus (E'), both of them being determined with the above dynamic measurements.

With reference to the samples mentioned above, for each of the tested property the Applicant calculated the root-mean-square deviation $\sigma$ and the scattering coefficient V in order to quantify the scattering of the measured values from the average value.

TABLE 3

| Test | Average value | Root-mean-square deviation σ | Scattering coefficient V (%) |
|---|---|---|---|
| Viscosity (ML 1 + 4 100° C.) | 45.20 | 0.705 | 1.56 |
| 100% Modulus (MPa) | 1.50 | 0.017 | 1.13 |
| 300% Modulus (MPa) | 7.04 | 0.031 | 0.44 |
| Stress at break (MPa) | 14.65 | 0.363 | 2.48 |
| Elongation at break (%) | 548.90 | 11.582 | 2.11 |
| E' (23° C.) (MPa) | 4.83 | 0.066 | 1.37 |
| E' (70° C.) (MPa) | 3.89 | 0.04 | 1.03 |
| Tan delta (23° C.) | 0.154 | 0.001 | 0.65 |
| Tan delta (70° C.) | 1.117 | 0.009 | 0.85 |
| IRHD Hardness (23° C.) | 55.00 | 0.209 | 0.38 |
| IRHD Hardness (100° C.) | 55.60 | 0.245 | 0.44 |

Example 2

Comparative

The elastomeric composition of the Example 1 was metered and fed to a co-rotating intermeshing twin-screw extruder by using the same production procedure and the same operating conditions of Example 1.

Analogously to Example 1, the elastomeric composition was extruded in the form of a continuous ribbon from which seven samples were obtained, submitted to curing and tested to evaluate the abovementioned properties.

Therefore, the procedure of Example 2 was different from the procedure of Example 1 in that the ribbon exiting from the extruder was not reduced into a subdivided form and not introduced into a stirring device.

The results are reported in Table 4.

TABLE 4

| Test | Average value | Root-mean-square deviation σ | Scattering coefficient V (%) |
|---|---|---|---|
| Viscosity (ML 1 + 4 100° C.) | 40.932 | 1.533 | 3.75 |
| 100% Modulus (MPa) | 1.529 | 0.149 | 9.74 |
| 300% Modulus (MPa) | 7.113 | 0.652 | 9.17 |
| Stress at break (MPa) | 14.772 | 0.661 | 4.47 |
| Elongation at break (%) | 546.190 | 36.070 | 6.60 |
| E' (23° C.) (MPa) | 4.99 | 0.123 | 2.46 |
| E' (70° C.) (MPa) | 3.96 | 0.128 | 3.23 |
| Tan delta (23° C.) | 0.161 | 0.004 | 2.48 |
| Tan delta (70° C.) | 1.130 | 0.009 | 6.92 |
| IRHD Hardness (23° C.) | 56.070 | 1.818 | 3.24 |
| IRHD Hardness (100° C.) | 52.260 | 1.891 | 3.62 |

By comparing the values reported in Tables 3 and 4, it can be pointed out that the scattering coefficients V relative to the measured physical-chemical properties of the elastomeric samples obtained with the production process of the present invention are remarkably lower than the corresponding scattering coefficients V of the elastomeric samples obtained with a traditional production process, i.e. with a production process not provided with an accumulating and stirring device according to the present invention.

As mentioned above, the fact that the scattering coefficients V can be notably reduced is particularly advantageous since very low scattering coefficients mean that the physical-chemical properties of the elastomeric composition obtained from the production process according to the present invention are substantially consistent during the whole duration of the production campaign.

This means that elastomeric manufactured products obtained from the same recipe at different moments of the production process are expected to show uniformity of properties as well as high quality consistency so that substantially the same behaviour can be ensured from product to product belonging to the same production campaign.

A further advantage of the present invention consists in that the presence of at least one stirring device in the production process of an elastomeric composition avoids the production of scraps, even during a recipe changing, since said scraps can be advantageously recycled.

The invention claimed is:

1. A process for continuously producing an elastomeric composition, comprising:
   metering at least one elastomer, at least one filler, and at least one minor ingredient;
   feeding the at least one elastomer, the at least one filler, and the at least one minor ingredient into at least one extruder;
   mixing and dispersing the at least one filler and the at least one minor ingredient into the at least one elastomer to form an elastomeric composition using the at least one extruder;
   obtaining a subdivided product in the form of discrete particles of the resulting elastomeric composition discharged from the at least one extruder;
   accumulating an amount of the discrete particles;
   stirring the accumulated amount of discrete particles in at least one stirring device while maintaining the discrete particles in subdivided form, and
   removing the stirred discrete particles from said at least one stirring device, wherein the stirred discrete particles remain in subdivided form during removal.

2. The process of claim 1, wherein mixing and dispersing the at least one filler and the at least one minor ingredient comprises a first and second mixing process, wherein the first mixing and dispersing process uses a first extruder, and the second mixing and dispersing process uses a second extruder.

3. The process of claim 2, wherein accumulating an amount of the discrete particles and stirring the accumulated amount of discrete particles are carried out downstream of the first mixing and dispersing process.

4. The process of claim 2, wherein accumulating an amount of the discrete particles and stirring the accumulated amount of discrete particles are carried out downstream of the second mixing and dispersing process.

5. The process of claim 1, wherein a first process of accumulating an amount of the discrete particles is carried out,
   wherein a first process of stirring the accumulated amount of discrete particles is carried out,
   wherein a second process of accumulating an amount of the discrete particles is carried out, and wherein a second process of stirring the accumulated amount of discrete particles is carried out.

6. The process of claim 5, wherein the first process of accumulating an amount of the discrete particles and the first process of stirring the accumulated amount of discrete particles are carried out downstream of a first mixing and dispersing process.

7. The process of claim 5, wherein the second process of accumulating an amount of the discrete particles and the second process of stirring the accumulated amount of discrete particles are carried out downstream of a second mixing and dispersing process.

8. The process of claim 1, further comprising discharging the stirred discrete particles.

9. The process of claim 8, wherein the discharging is carried out continuously.

10. The process of claim 8, wherein the discharging is carried out batchwise.

11. The process of claim 1, wherein the at least one minor ingredient comprises one or more of: crosslinking agents, crosslinking accelerators, synthetic resins, crosslinking activators, crosslinking retardants, adhesion promoters, protective agents, coupling agents, and condensation catalysts.

12. The process of claim 1, wherein the at least one stirring device comprises a rotating drum.

* * * * *